Patented Oct. 23, 1923.

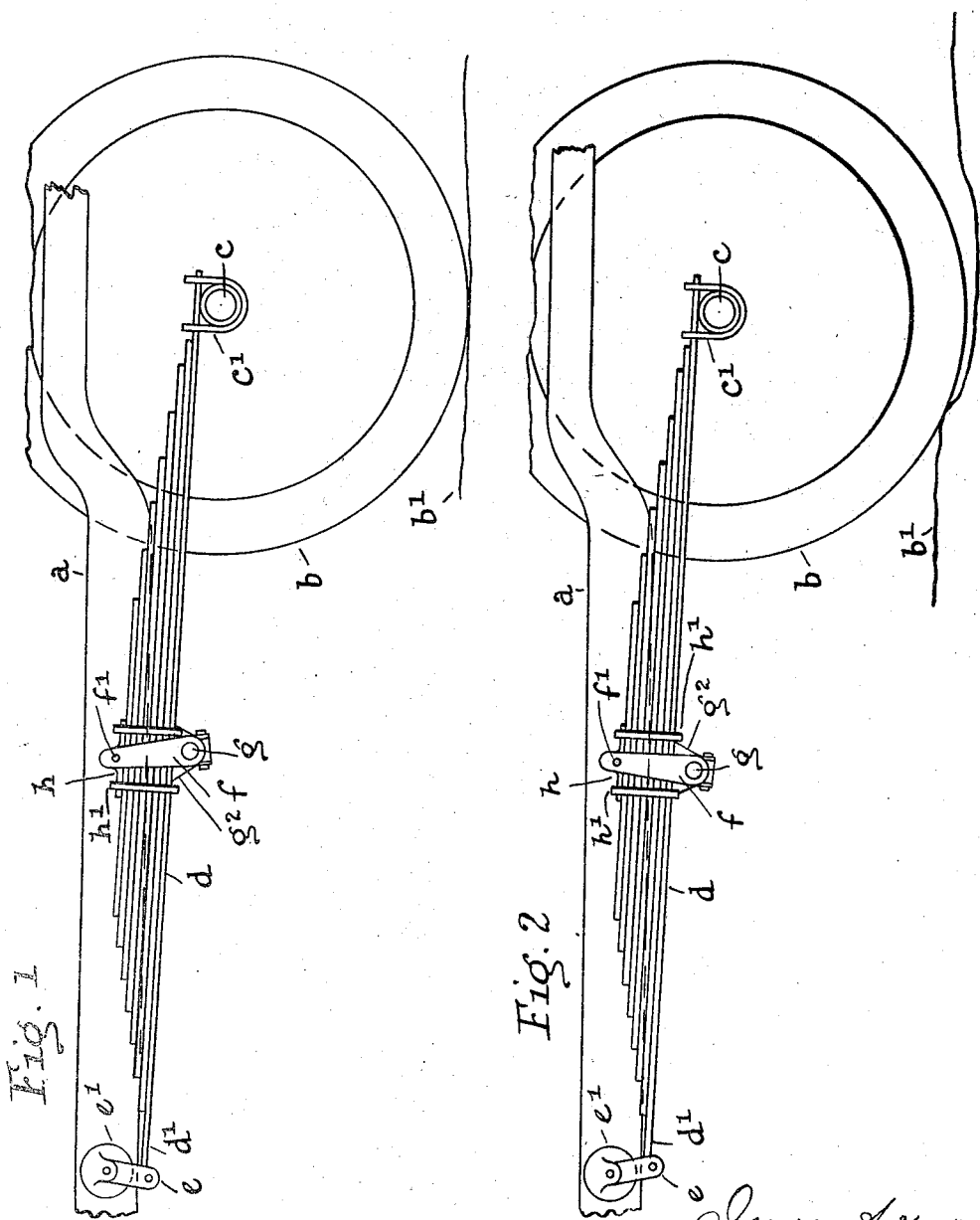

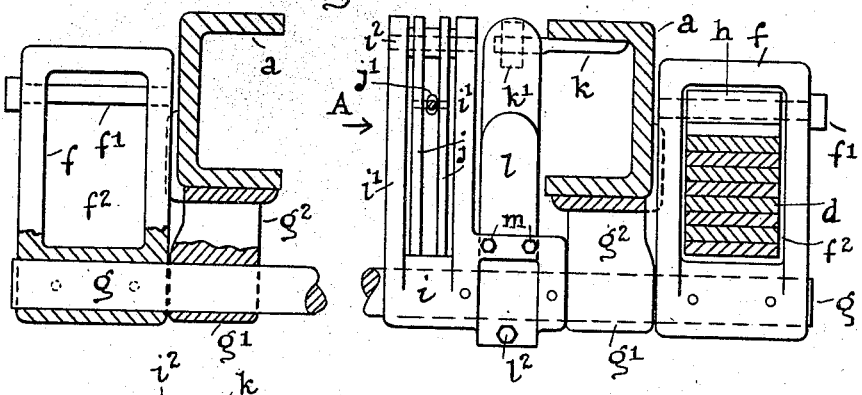
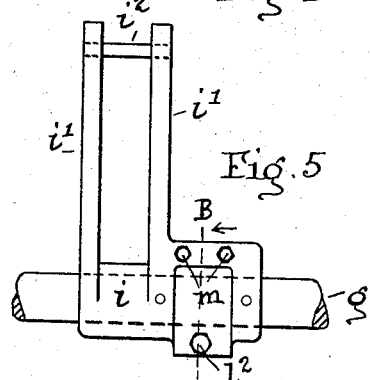
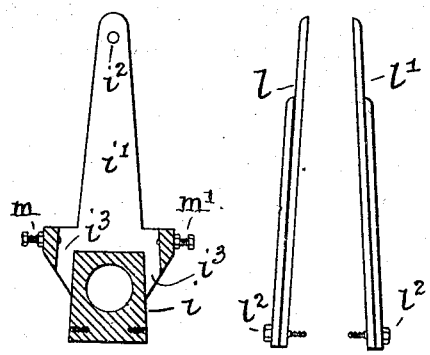
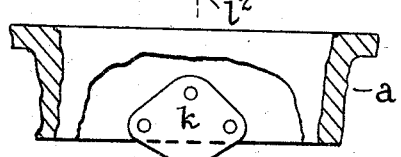

1,471,622

UNITED STATES PATENT OFFICE.

NORMAN SINCLAIR McNAB, OF MELBOURNE, VICTORIA, AUSTRALIA, ASSIGNOR TO THOMAS LEE COURTNEY AND HUGH KEITH, JUNIOR, OF WYCHITELLA, VICTORIA, AUSTRALIA.

MOTOR-CAR-SPRING MECHANISM.

Application filed September 22, 1920. Serial No. 412,020.

*To all whom it may concern:*

Be it known that I, NORMAN SINCLAIR McNAB, a subject of the King of Great Britain and Ireland, etc., residing at 331 Collins Street, Melbourne, in the State of Victoria, Commonwealth of Australia, have invented certain new and useful Improvements in Motor-Car-Spring Mechanism; and I do hereby declare the following to be a full, clear, and exact description of the invention, such as will enable others skilled in the art to which it appertains to make and use the same.

This invention relates to improved spring mechanism for motor cars or other vehicles, to reduce or absorb shocks due to the road wheels travelling over irregular surfaces.

The mechanism relates in part to the mounting of leaf springs (which may be of cantilever type) at each side of the car and in part to cushioning means to permit of and to modify forward or (as the case may be) rearward movement of the chassis frame relative to the road wheels and their axle, as well as to allow of upward and downward movement.

The application of the invention is illustrated in the drawings herewith with reference to motor car rear road wheels, but the construction may be modified as to designs and proportions of parts, and in other minor respects while retaining matter hereinafter claimed.

In the drawings, Figure 1 is a side elevation showing part of a chassis the rear road wheel appearing in outline.

Figure 2 shows the parts in Figure 1 in a position which occurs when the wheel is overcoming a road irregularity as shown; the chassis frame having (as will appear from comparison with Figure 1) moved forward relatively to the leaf spring and the said wheel.

Figures 3 to 11 are on a larger scale.

Figure 3 shows a transverse vertical section through the chassis frame and through a leaf spring at one side of the car, the other leaf spring and some parts near it being omitted to allow of clear illustration of what appears.

Figure 4 shows various parts as seen when looking in the direction of arrow A in Figure 3.

Figures 5 to 11 show various details.

Figure 5 is a view of part of a rock shaft carrying a bracket which carries the cushioning springs and may carry the lever next mentioned, and Figure 6 shows the bracket in section on line B.

Figure 7 shows the said cushioning springs.

Figure 8 shows the lever last mentioned having connecting rods attached to it.

Figure 9 shows the last mentioned lever from a point of view at right angles to that of Figure 8.

Figure 10 shows a plan of part of the chassis frame carrying a bracket and roller used in connection with the cushioning springs.

Figure 11 shows the fulcrum plate or pad of the leaf spring of Figures 1 and 2.

In these drawings $a$ represents part of the side of the chassis frame, $b$ a rear road wheel, $c$ its axle, $b^1$ a roadway, and $d$ one of the leaf springs as provided at each side of the chassis, secured to the wheel axle $c$ in any suitable manner, as by the connection $c^1$.

A suitable part as the forward end $d^1$ of each leaf spring is shackled by suitable connections, as a link $e$ pivoted to a bracket $e^1$ fixed to the chassis frame $a$. Another suitable part, the center for example, (or a part near the center) of each leaf spring is fulcrumed by means of a pad or plate $h$, against a member carried by a recessed lever $f$, and shown as a transverse pin $f^1$ which has ends supported in lever sides. The said pad $h$ is fixed to spring $d$ by clips $h^1$ and moves with that spring and lever $f$ which contains an aperture $f^2$ within which the fulcrumed part of the leaf spring is housed.

Each lever $f$ is fixed to or forms part of a transverse supporting rock shaft $g$, which is pivoted in bearings $g^1$ on a supporting bracket $g^2$ attached to the chassis frame at each side of the car.

To allow of the adjustment of the brake when this invention is used a bracket $i$ next described may be utilized, but such utilization is merely incidental to the rest of the invention. The main purpose of a bracket at $i$ is to carry cushioning springs described hereinafter.

The (or each) bracket $i$ (one at each side of the shaft $g$) has an apertured base fixed to the rock shaft $g$ and a fork or arms $i^1$ carrying a cross pin $i^2$, which may be utilized by carrying pivotally a lever $j$ which has parallel arms, and has pivotally connected to it an upper rod $j^1$ (connected to the brake mechanism of wheel $b$) and a lower rod $j^2$ connected to the brake lever which the driver actuates when required.

As there is not only upward and downward movement of the chassis on the rear wheels and axle but also the chassis moves bodily forward in relation to its wheels, while its rear wheels receive road shocks, such forward movement would therefore disturb the brakes as now in use. To prevent this the compensating lever $j$ is pivoted to bracket $i$ which moves with the springs and rear axle to automatically take up the slack in the rods between the brake-actuating lever and the brakes. The rod $j^2$ connecting lever $j$ to the brake-actuating lever is pivoted to lever $j$ as near the point of minimum movement (in relation to the brake lever) as possible. Rod $j'$ is connected to lever $j$ at the point of minimum movement in relation to the rear axle and springs, i e. on the axial line of spring pivots $f$. Thus, though the rear wheels at times approach the brake-actuating lever on the chassis, brake regulation is not disturbed because as a connection between the two sections of brake rods there is the compensating lever $j$.

$l$, $l^1$, are cushioning springs which are shown bolted in recesses $i^3$ of bracket $i$ and which have outer ends which engage opposite sides of a pressure member shown as a roller $k^1$ which is upon a bracket $k$ attached to the chassis frame so that when the frame moves it carries the roller with it and thus pushes one or other of the springs $l$, $l^1$. One or other of the springs $l$, $l^1$, can be caused to increase its pressure on the roller, by partial rotation of the rock shaft $g$, as well as by the longitudinal movement of the frame $a$ when road shocks occur. The resistance of springs $l$, $l^1$, to the roller is regulated as by a screw and lock nut $m$, or $m^1$ on bracket $i$. The effect of this construction is that the swinging movement of the levers $f$ forward or rearward when the rock shaft $g$ rotates is cushioned by the horizontally effective spring $l$ or $l^1$, and the transmission of shock from the road wheels to the chassis is reduced.

Instead of leaf springs $l$, $l^1$, other forms as coiled springs may be used. Such cushioning springs are placeable in various positions to cushion the shocks of longitudinal movement of the car frame, but retaining their occupation as set forth, with the leaf springs $d$.

Having described this invention, what is claimed by Letters Patent is:—

1. The combination with a chassis frame, of an axle, leaf springs arranged at the sides of the frame and to which springs the axle is connected, pivoted connections between the springs and frame to allow forward or rearward as well as upward or downward movement of the frame relatively to the axle, a rock shaft carried by the frame, said springs having a fulcrumed connection adjacent their center with said rock shaft so as to be moved by the latter, as described, and cushioning springs arranged upon opposite sides of the rock shaft and having a fixed connection at one end with said shaft, and a pressure member carried by the frame, upon opposite sides of which pressure member the other end of the springs bear.

2. The combination with a chassis frame, of an axle, leaf springs arranged at the sides of the frame and to which springs the axle is connected, pivoted connections between the springs and frame to allow forward or rearward as well as upward or downward movement of the frame relatively to the axle, a rock shaft carried by the frame, said springs having a fulcrumed connection adjacent their center with said rock shaft so as to be moved by the latter, cushioning springs arranged upon opposite sides of the rock shaft, a bracket secured to the rock shaft and to which bracket one end of the cushioning springs is secured, and a pressure member carried by the frame, upon opposite sides of which pressure member the other end of the springs bears.

3. The combination with a chassis frame, of an axle, leaf springs arranged at the sides of the frame and to which springs the axle is connected, pivoted connections between the springs and frame to allow forward or rearward as well as upward or downward movement of the frame relatively to the axle, a rock shaft carried by the frame, said springs having a fulcrumed connection adjacent their center with said rock shaft so as to be moved by the latter, cushioning springs arranged upon opposite sides of the rock shaft, a bracket secured to the rock shaft and to which bracket one end of the cushioning springs bears, a pressure member carried by the frame, upon opposite sides of which pressure member the other end of the cushioning springs bears, and means for varying the cushioning resistance of the last-named springs comprising screws carried by the bracket and bearing against the said cushioning springs as described.

In witness whereof I have hereunto set my hand.

NORMAN SINCLAIR McNAB.